Aug. 15, 1939.  W. B. GRIESE  2,169,605
REFRIGERATOR UNIT TESTING
Filed Nov. 5, 1937

INVENTOR.
WILLIAM B. GRIESE.
BY Allen & Allen
ATTORNEYS.

Patented Aug. 15, 1939

2,169,605

UNITED STATES PATENT OFFICE 2,169,605

REFRIGERATOR UNIT TESTING

William B. Griese, Cincinnati, Ohio, assignor to The Crosley Corporation, Cincinnati, Ohio, a corporation of Ohio Application November 5, 1937, Serial No. 172,995

5 Claims. (Cl. 23—232)

This invention relates to a method of testing refrigerator units and to an apparatus designed therefor. More particularly it relates to the testing of such units for leakage of refrigerant.

Great difficulty has been had in the past with domestic refrigerators which have been returned to the factory for repair or replacement on account of minute leakage in the system. The reason for this has been that the detection of such leakage is extremely difficult. The refrigerant used in most modern refrigerators is odorless, colorless and tasteless, so that it becomes extremely difficult to detect its presence in any ordinary manner, particularly if the leakage is small and only small amounts of the gas are present.

Furthermore, known methods of testing for leakage have never been advantageous for the reason that they consume great amounts of time and slow up production.

With the above difficulties in mind, it is an object of my invention to provide a method for testing refrigerator units which will not only disclose mechanical imperfections, if such be present, but which will also disclose any leakage of refrigerant.

It is another object of my invention to provide a method as above outlined which will be more rapid than any method known heretofore, and which will not slow up the production line to any great extent.

Still another object of my invention is to provide an apparatus for testing refrigerator units which will be simple to manufacture and will prove advantageous for the purpose.

These and other objects of my invention which will be pointed out hereinafter, or which will be apparent to one skilled in the art upon reading these specifications, I accomplish by that series of process steps and by that apparatus of which I shall now describe exemplary embodiments.

Reference is now made to the drawing forming a part hereof, and in which.

Figures 1, 2, 3:
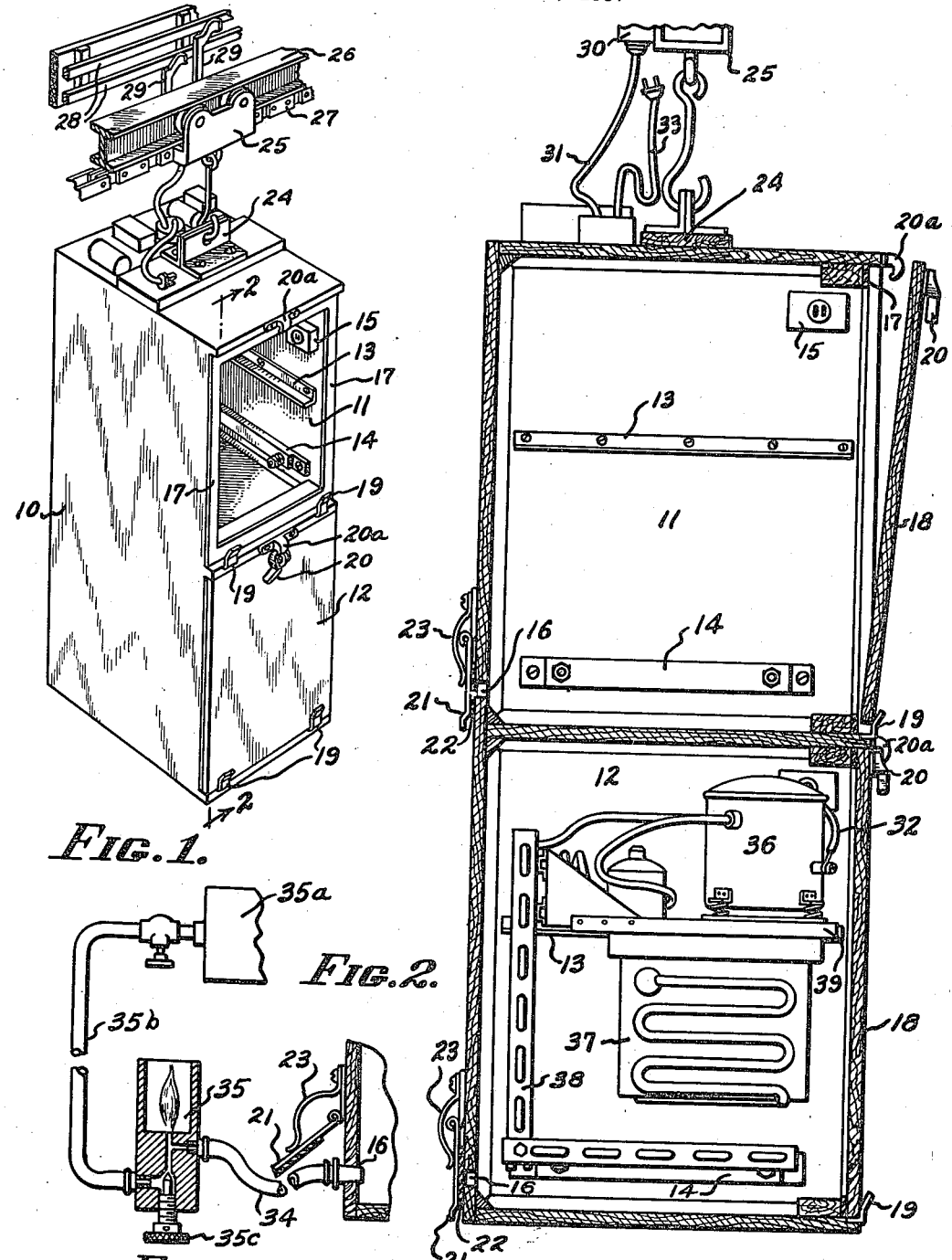
Figure 1 is a perspective view of a device according to my invention.
Fig. 2 is a vertical cross-sectional view taken on the line 2—2 of Fig. 1.
Fig. 3 is a detail view similar to Fig. 2, showing only the lower left-hand corner thereof.

Briefly in the practice of my invention, I charge a newly built refrigerator unit with refrigerant gas. It is to be understood that the particular gas used forms no limitation upon my invention, although for purposes of description I will describe my method in connection with the use of a refrigerant known to the trade as Freon, which is an odorless, colorless and tasteless gas.

I will place the charged unit into a compartment which is capable of being tightly closed so as to be gas-proof, and I provide electrical connections so that the unit may run inside the compartment. I permit the unit to run for a period of time sufficient to cause the refrigerant to be thoroughly distributed throughout the system. For example, but without limitation, I prefer to run the unit for approximately two hours. When the refrigerant has been thoroughly distributed throughout the system, I turn off the unit, and I provide means for heating the interior of the compartment. This heating will have the effect of causing expansion of the gas within the unit whereby an extraordinary pressure is built up within the unit, and whatever leakage there may be is of course intensified.

Therefore I open the compartment by means of specially provided cover and insert into the opening a hose which is connected to a mixing valve. Another hose comes to the mixing valve from an acetylene tank. The acetylene torch normally has a yellow flame, but if there is present within the compartment any escaped refrigerant, the flame of the acetylene torch will take on a greenish-blue color, depending upon the amount of refrigerant present in the compartment. If there is merely a trace, the flame will be yellow streaked with green, and the more refrigerant present, the bluer the flame will become, until if large quantities of refrigerant have escaped, the flame will be very blue.

It will be seen that the approximately two hour running period involved in the above outlined test, provides a running test for the mechanical parts of the refrigerator, and any abnormalities may be readily detected. As a matter of convenience, I prefer to mount the compartment within which the unit is to operate on a trolley, so that it may travel along a conveyor, and I provide for electrical contact, other trolleys riding on bus bars passing adjacent the conveyor system. I have also found it desirable to make the compartment double, so that it will accept two units. It is to be understood, of course, that depending upon space limitations, my apparatus may be made to contain as many units as desired.

Referring now to Figure 1, I have shown at 10, a test compartment according to my invention, comprising upper and lower compartments 11 and 12 respectively. The compartments are provided on their interior with channel iron guides 13, for the purpose of holding the unit to be placed therein, and with bar electric heaters of conventional type, as indicated at 14. An electric outlet is provided at 15.

The compartments 11 and 12 are completely sealed except for an opening in the front, as seen at the upper part of Figure 1, and a small perforation in the rear wall as indicated in Figs. 2 and 3 at 16. Surrounding the opening at the front of the compartment, I provide a rubber sealing strip 17, and I provide a door or cover member 18, for the purpose of covering said opening and sealing it by contact with the strip 17. Although the door may be attached by any known means, I prefer to provide a pair of lugs 19, at the bottom of the opening so that the door member 18 may be placed within said lugs, and I prefer to provide at the top, a latch unit such as those commonly used on sash type windows, as indicated at 20 and 20a. By these means I provide a tight fit between the door member 18 and the sealing strip 17. The opening 16 is covered by a hinged lid member 21, provided with a rubber sealing member 22. The member 21 is held in place by means of a spring arrangement as generally indicated at 23. It is understood of course, that the lower compartment is made exactly like the upper, and I will therefore describe only the upper compartment.

At the top of the test device, I provide suspension means, generally indicated at 24, whereby the device may be suspended from a trolley 25, adapted to ride upon a rail 26. Any desired means such as a chain 27, may be provided for causing movement of the trolley 25 along the track 26. Adjacent the track 26, I provide bus bars 28, which are contacted by the trolleys 29 which lead to the junction box 30, by which connection may be made to the interior of the cabinet, as will now be described.

I provide leads from the outlet 15 by means of a cable 31, which is provided with a coupling member whereby it may be plugged into the junction box 30. Thus when a unit is placed within the compartment and the motor thereof is connected by means of leads 32 to the outlet 15, the unit will be caused to operate.

I provide another lead indicated at 33, connected to the heating bars 14, so that after the unit has operated for the required length of time, the lead 31 may be removed, and the lead 33 attached to the junction box 30 instead.

In Fig. 3, I have indicated a tube 34 connected into the hole 16 and leading to a burner chamber indicated generally at 35. Acetylene is fed to the burner from a tank 35a through a tube 35b, and the feed is controlled by a valve 35c. The color of the flame may readily be observed by looking into the chamber 35.

In the lower part of Fig. 2, I have shown a unit in place in the testing compartment. This unit comprises the compressor and motor dome indicated generally at 36, and the evaporator indicated generally at 37, and the condenser indicated generally at 38. The various parts of the unit are mounted upon a base 39, which rests upon the angle irons 13, to support the unit within the test compartment. The unit shown in the lower part of Fig. 2, is shown in the condition in which it is packed for shipment, that is, with the condenser folded at right angles, approximately at its center. It is of course, understood that when the unit is assembled in the refrigerator cabinet, the condenser is straightened out so as to occupy a space at the rear of the cabinet.

It is to be understood that I do not wish to be limited to the specific construction of the test compartment shown, nor to the specific refrigerant used, nor to the specific unit tested. It will be clear to those skilled in the art that refrigerator units containing other refrigerants than Freon, could be tested similarly by the substitution perhaps of some other test than the acetylene flame test without departing from the spirit of my invention. Likewise the test device could be made to have a single test compartment or more than two test compartments, and it is not a limitation upon my invention that I have shown the test compartment mounted upon a conveyor.

I have found that the mounting of the test compartment on a conveyor permits me to conduct the above described test without slowing down the production line, inasmuch as the units are thus kept moving through the plant toward the packing point, and of course, production could be still further speeded up by providing more than two test compartments.

Having thus described my invention, what I believe to be new and desire to protect by Letters Patent is:

1. A process of testing a refrigerator unit which includes the steps of charging said unit, closely confining it in a substantially gas tight chamber, running said unit for a period of time so that the refrigerant is distributed throughout the unit, heating said chamber otherwise than by the running of a unit, whereby to cause an expansion and resulting increase in pressure of the refrigerant in the unit whereby any leak in the system is intensified, and to cause an increase in pressure in the chamber and then testing for the presence of escaped refrigerant in said chamber.

2. A process of testing a refrigerator unit which includes the steps of causing the refrigerant in the system to be thoroughly distributed throughout the system, closely confining the unit within a substantially gas tight chamber, increasing the temperature within the chamber whereby the pressure of the refrigerant within the unit is increased and any potential leakage intensified, and whereby the pressure in the chamber is increased and then making a qualitative test to determine the presence of such refrigerant within said compartment.

3. The method of testing for leakage a refrigeration unit including the evaporator, compressor, condenser, and interconnecting members, which consists in closely confining the entire unit within a substantially gas tight chamber, operating the said unit within said chamber thereby generating heat, permitting the temperature to come to substantial equilibrium in the unit, and then testing qualitatively the gaseous content of the chamber.

4. The method of testing for leakage a refrigeration unit including the evaporator, compressor, condenser, and interconnecting members, which consists in closely confining the entire unit within a substantially gas tight chamber, operating the said unit within said chamber thereby generating heat, permitting the temperature to come to substantial equilibrium in the unit, and then testing qualitatively the gaseous content of the chamber, said test comprising causing a stream of the heated and expanded gases within the chamber to flow there-from and be admixed with a white burning gas, whereby the existence of leakage will be indicated by the color of resulting flame.

5. The method of testing for leakage a refrigeration unit including the evaporator, compressor, condenser and interconnecting members which consists in closely confining the entire unit within a portable substantially gas-tight chamber, operating the said unit within said chamber thereby generating heat, permitting the temperature to come to substantial equilibrium in the unit, and then testing qualitatively the gaseous content of the chamber.

WILLIAM B. GRIESE.